United States Patent
Crocker et al.

(10) Patent No.: US 6,272,840 B1
(45) Date of Patent: Aug. 14, 2001

(54) PILOTED AIRBLAST LEAN DIRECT FUEL INJECTOR

(75) Inventors: David S. Crocker; Daniel A. Nickolaus, both of Huntsville; Clifford E. Smith, Madison, all of AL (US)

(73) Assignee: CFD Research Corporation, Huntsville, AL (US)

( * ) Notice: Subject to any disclaimer, the term of this patent is extended or adjusted under 35 U.S.C. 154(b) by 0 days.

(21) Appl. No.: 09/649,518

(22) Filed: Aug. 29, 2000

Related U.S. Application Data (60) Provisional application No. 60/176,379, filed on Jan. 14, 2000.

(51) Int. Cl.[7] .............................. F02C 7/228; F23R 3/14
(52) U.S. Cl. ............................ 60/39.06; 60/746; 60/742; 60/748; 239/404; 239/405
(58) Field of Search ................... 60/39.06, 742, 60/746, 748; 239/404, 405, 406, 424, 424.5; 431/284, 182, 183

(56) References Cited

U.S. PATENT DOCUMENTS

| | | | |
|---|---|---|---|
| 3,866,413 | * 2/1975 | Sturgess et al. | 60/748 |
| 3,937,011 | * 2/1976 | Caruel et al. | 239/406 |
| 5,224,333 | 7/1993 | Bretz et al. | |
| 5,256,352 | 10/1993 | Snyder. | |
| 5,477,685 | 12/1995 | Samuelson et al. | |
| 5,505,045 | 4/1996 | Lee et al. | |
| 5,603,211 | 2/1997 | Graves. | |
| 5,613,363 | 3/1997 | Joshi et al. | |
| 5,737,921 | * 4/1998 | Jones et al. | 60/748 |
| 5,816,050 | 10/1998 | Sjunnesson et al. | |
| 5,960,724 | * 10/1999 | Toqan et al. | 431/182 |
| 5,987,889 | 11/1999 | Graves et al. | |
| 6,189,314 | * 2/2001 | Yamamoto et al. | 60/746 |

OTHER PUBLICATIONS

A general summary of the various types of fuel injectors for gas turbine engines is shown in the text of Lefebvre, *Gas Turbine Combustion* (1983) at Chapter 10 thereof.
Smith, et al., Journal of Propulsion and Power, vol. 11, No. 2, Mar–Apr 1995, "Duel–Spray Airblast Fuel Nozzle for Advanced Small Gas Turbine Combustors", pp. 244–251.
AIAA Paper No. AIAA–87–1826, 1987,entitled "Design and Test Verification of a Combustion System for an Advanced Turbo Fan Engine" by Sanborn et al.
ASME Paper No. 2000–GT–117 entitled "A New Hybrid Airblast Nozzle for Advanced Gas Turbine Combustors".
ASME Paper No. 2000–GT–0079 "Supression of Dynamic Combustion Instabilities by Passive and Active Means".

* cited by examiner

*Primary Examiner*—Ted Kim
(74) *Attorney, Agent, or Firm*—Waddey & Patterson Lucian Wayne Beavers (57) ABSTRACT

A gas turbine fuel injection system of the lean direct injector type designed to reduce nitrous oxide (NOx) emissions is provided. The configuration includes a pilot fuel injector for injecting a pilot fuel stream, and a pilot swirler for providing a swirling pilot air stream to atomize and entrain the pilot fuel stream. A main airblast fuel injector is located concentrically about the pilot fuel injector, for injecting a main fuel stream concentrically about the pilot fuel stream. Inner and outer main swirlers provide a swirling main air stream to atomize and entrain the main fuel stream. An air splitter is located between the pilot swirler and the main swirler. The air splitter is so arranged and constructed as to divide the pilot air stream exiting the pilot swirler and the air splitter, from the main air stream exiting the inner main swirler, whereby a bifurcated recirculation zone is created.

30 Claims, 4 Drawing Sheets

PILOTED AIRBLAST LEAN DIRECT FUEL INJECTOR

REFERENCE TO PRIOR APPLICATIONS

This application claims benefit of our co-pending provisional patent application Ser. No. 60/176,379 filed on or about Jan. 14, 2000 entitled "METHOD AND APPARATUS FOR DECREASING COMBUSTOR EMISSIONS".

GOVERNMENT SUPPORT

The invention was made with U.S. government support under Contract No. NAS3-37746 awarded by the National Aeronautics and Space Administration under the Small Business Innovative Research (SBIR) program. The government has certain rights in this invention.

BACKGROUND OF THE INVENTION

1. Field of the Invention

The present invention relates generally to fuel injection assemblies for gas turbine engines, and more particularly, but not by way of limitation, to fuel injectors of the general type known as lean direct injectors (LDI) which are designed to reduce nitrous oxide (NOx) emissions.

2. Description of the Prior Art

There is a continuing need, driven by environmental concerns and governmental regulations, for improving the efficiency of and decreasing the emissions from gas turbine engines of the type utilized to power jet aircraft or generate electricity. Particularly, there is a continuing drive to reduce nitrous oxide (NOx) emissions.

Advanced gas turbine combustors must meet these requirements for lower NOx emissions under conditions in which the control of NOx generation is very challenging. For example, the goal for the Advanced Subsonic Technology (AST) gas turbine combustor research being done by NASA is a 50 to 70 percent reduction in NOx emissions and an 8 percent improvement in fuel efficiency compared to ICAO 1996 STANDARDS TECHNOLOGY. Realization of the fuel efficiency objective will require an overall cycle pressure ratio as high as 60 to 1 and a peak cycle temperature of 3000° F. or greater. The severe combustor pressure and temperature conditions required for improved fuel efficiency make the NOx emissions goal much more difficult to achieve.

One approach to achieving low NOx emissions is via a class of fuel injectors known as lean direct injectors (LDI). Lean direct injection designs seek to rapidly mix the fuel and air to a lean stoichiometry after injection into the combustor. If the mixing occurs very rapidly, the opportunity for near stoichiometric burning is limited, resulting in low NOx production.

A general summary of the various types of fuel injectors for gas turbine engines is shown in the text of Lefebvre, *Gas Turbine Combustion* (1983) at Chapter 10 thereof. FIG. 10.61 of the Lefebvre text discloses the basic design features of a piloted airblast atomizer, having a central pilot simplex pressure atomizer surrounded by a main airblast atomizer.

U.S. Pat. No. 5,477,685 to Samuelson et al. discloses a lean burn injector utilizing a ring of radial injection ports, which inject fuel into a chamber where it mixes with swirling air.

U.S. Pat. No. 5,505,045 to Lee et al. discloses a dual airblast injector having first and second concentrically located airblast injectors.

U.S. Pat. No. 5,603,211 to Graves discloses an injector having an axial fuel injector surrounded by three swirlers having different swirl angles.

U.S. Pat. No. 5,816,050 to Sjunnesson et al. discloses a low emission combustion chamber for gas turbine engines having an axial pilot fuel injector having an associated first flow swirler, and having a main fuel injector which injects flow into an annular chamber divided from the pilot fuel injector by a divider wall.

Smith, et al., Journal of Propulsion and Power, Vol. 11, No. 2, March–April 1995, "Dual-Spray Airblast Fuel Nozzle for Advanced Small Gas Turbine Combustors", p. 244–251, describes a dual airblast nozzle.

Thus, it is seen that there is a continuing need for improved designs in fuel injector systems, for gas turbine engines and particularly lean direct injector systems, for providing improved combustion efficiencies and reduced emissions of various pollutants, particularly NOx.

SUMMARY OF THE INVENTION

The present invention provides a fuel injection system for a gas turbine engine which includes a pilot fuel injector, a pilot swirler for swirling air past the pilot fuel injector, a main airblast fuel injector, inner and outer main swirlers for swirling air past the main airblast injector, and an air splitter located between the pilot swirler and the inner main swirler. For a dual airblast configuration, there is an additional air swirler radially inside the pilot fuel injector. The air splitter is so arranged and constructed as to divide a pilot air stream exiting the pilot swirler from a main air stream exiting the inner main swirler, whereby a bifurcated recirculation zone is created between the pilot air stream and the main air stream.

No central recirculation zone is created. The pilot fuel stream is either injected (at high fuel pressure drops) or centrifuged (at low fuel pressure drops) into the bifurcated recirculation zone. The pilot flame is aerodynamically anchored and separated from the main flame. This allows the pilot flame to operate in a stable manner on its own during low power operation, thus minimizing problems with lean blowout of the pilot.

A relatively large amount of air is introduced through the main swirlers. This air can effectively prevaporize and partially premix with the main fuel, resulting in a leaner and cooler high power flame which produces less NOx emissions.

Thus, a lean direct injection (LDI) fuel nozzle is provided which can achieve the desired low NOx emission goals while maintaining acceptable lean blowout performance. The radially staged injection of fuel and air between the pilot injector and the main injector is key to this performance. The radial staging accomplishes two important objectives. First, excellent fuel/air distribution resulting in very low NOx is achieved at high power conditions by injecting the fuel in the form of an inner pilot fuel injection and an outer concentric ring. Second, the radial staging of the two fuel injection streams provides good low power operability by allowing operation of only the inner stage at low power conditions such as engine idle conditions. The result is a relatively rich and stable pilot flame at idle conditions.

It is therefore, a general object of the present invention to provide an improved lean direct injector for gas turbine engines.

Another object of the invention is the provision of fuel injectors for gas turbine engines which result in low emissions of pollutants, particularly low NOx emissions, and CO emissions at low power conditions such as idle.

Another object of the present invention is the provision of a fuel injector for a gas turbine engine which has superior lean blowout performance.

Another object is that the fuel injector be designed to operate at the high power conditions of advanced gas turbine engines without thermal damage to the fuel injector itself Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
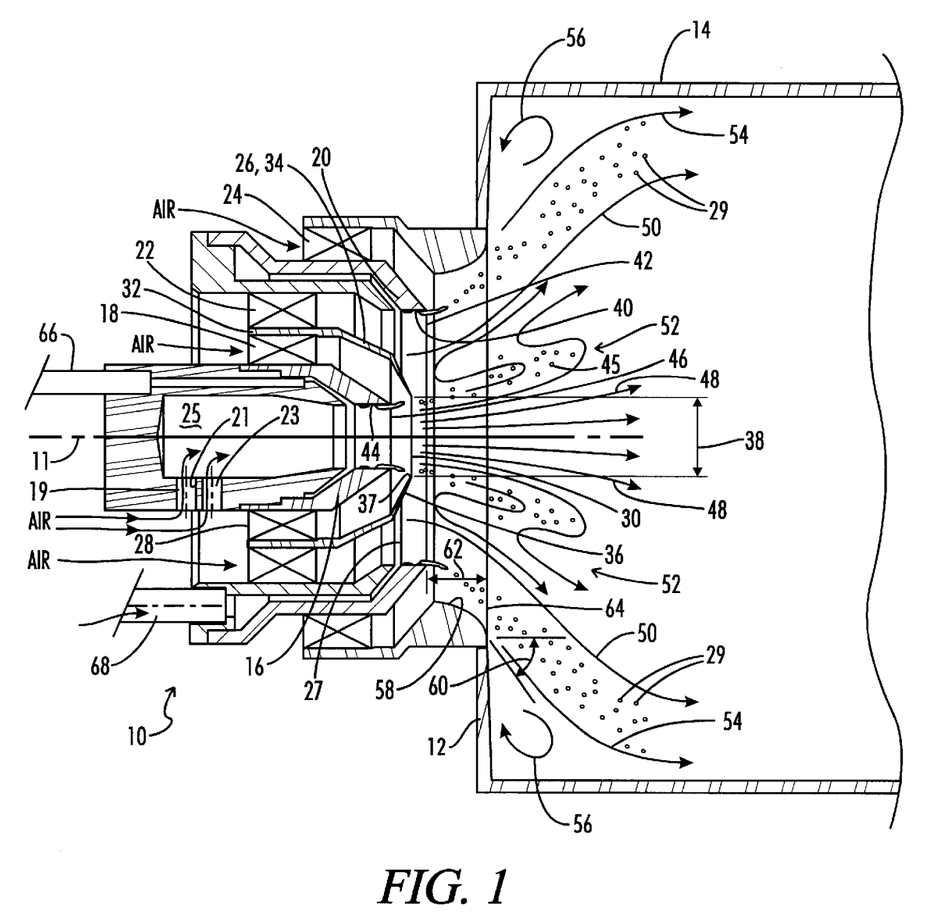
FIG. 1 is a sectioned schematic view of a first embodiment for a piloted airblast lean direct fuel injector. The embodiment of FIG. 1 includes an airblast pilot injector and an airblast main injector. A combustor chamber downstream of the fuel injector is schematically illustrated as are the air streams and fuel spray distribution patterns of the fuel/air mixture exiting the fuel injector.

The Dual Airblast Injector of FIG. 1

Referring now to the drawings, and particularly to FIG. 1, a fuel injection system is shown and generally designated by the numeral 10. The fuel injection system 10 is mounted upon the dome wall 12 of a combustor 14 of a gas turbine engine.

Fuel injector system 10 has a central axis 11. The fuel injection system 10 includes a pilot fuel injector 16, and a pilot swirler 18 for swirling air past the pilot fuel injector 16. The pilot swirler 18 is schematically illustrated, and in the illustrated embodiment it is an axial vane type pilot swirler 18. In general, the pilot swirler 18, and any of the other swirlers, can be either radial vaned or axial vaned swirlers.

When utilizing an airblast type pilot fuel injector 16 as illustrated in FIG. 1, the pilot swirler 18 may be further described as an outer pilot swirler 18, and the pilot airblast fuel injector 16 will have associated therewith an inner pilot swirler 19. Inner pilot swirler 19 in the illustrated embodiment includes tangentially oriented flow ports 21 and 23 leading into an interior swirl chamber 25 which leads to the filmer lip 44 of the airblast type pilot fuel injector 16.

The fuel injection system 10 further includes a main airblast fuel injector 20 which is concentrically located about the pilot fuel injector 16. Inner and outer main swirlers 22 and 24 are located concentrically inward and outward of the main airblast fuel injector 20. The pilot fuel injector 16 and main fuel injector 20 may also be described as a primary fuel injector 16 and a secondary 20 fuel injector, respectively.

As will be understood by those skilled in the art, an airblast fuel injector such as injector 20 provides liquid fuel to an annular outlet 27 which allows the fuel to flow in an annular film along atomizer filmer lip 40 leading to the aft end 42 of the injector. The annular film of liquid fuel is then entrained in the much more rapidly moving and swirling air streams passing through inner main swirler 22 and outer main swirler 24, which air streams cause the annular film of liquid fuel to be atomized into small droplets which are schematically illustrated and designated by the numeral 29. Preferably, the design of the airblast main fuel injector is such that the main fuel is entrained approximately midstream between the air streams exiting the inner main swirler and the outer main swirler.

The vane angles of the outer main swirler may be either counter-swirl or co-swirl with reference to the vane angles of the inner main swirler. Likewise, the swirl angle of the inner pilot airflow may be either counter-swirl or co-swirl with respect to the swirl direction of the outer pilot airflow.

An air splitter 26 is located between the pilot swirler 18 and the inner main swirler 22. The air splitter 26 has an upstream inlet end 28 and a downstream outlet end 30. The geometry of the air splitter 26 includes a cylindrical upstream portion 32, a radially inward tapered intermediate portion 34, and a further radially tapered downstream portion 36. The downstream portion 36 terminates in the circular outlet 30 defined by trailing edge 37 and having a diameter indicated at 38.

The main airblast fuel injector 20 includes an atomizer filmer 40 having an aft end 42. The pilot airblast atomizer 16 has an atomizer filmer lip 44 having an aft end 46.

The outlet 30 of air splitter 26 is axially positioned upstream of the aft end 42 of the main airblast fuel injector 20 and downstream of the aft end 46 of the pilot airblast fuel injector 16.

The geometry of and location of the air splitter 26 is such that the air splitter divides a pilot air stream exiting the pilot swirler 18 and the outlet 38 of air splitter 26 from a main air stream exiting the inner and outer main swirlers 18 and 22, whereby a bifurcated recirculation zone is created between the pilot air stream and the main air stream.

In FIG. 1, the outer edge of the pilot air stream is schematically illustrated by arrows 48 and the inner edge of the main air stream is schematically designated by arrows 50. The bifurcated recirculation zone is generally indicated in the area at 52. It will be understood that the bifurcated recirculation zone 52 is a generally hollow conical aerodynamic structure which defines a volume in which there is some axially rearward flow. This bifurcated recirculation zone 52 separates the axially aft flow of the pilot injector 16 as designated by arrows 48 from the axially aft flow associated with main injector 20 as designated by the arrows 50. It is noted that there is no central recirculation zone, i.e. no reverse flow along the central axis 11 as would be found in conventional fuel injectors.

The creation of the bifurcated recirculation zone which aerodynamically isolates the pilot flame from the main flame benefits the lean blowout stability of the fuel injector. The pilot fuel stays nearer to the axial centerline and evaporates there, thus providing a richer burning zone for the pilot flame than is the case for the main flame. The fuel/air ratio for the pilot flame remains significantly richer than that for the main flame over a wide range of operating conditions. Most of the NOx formation occurs in this richer pilot flame, and even that can be further reduced by minimizing the proportion of total fuel going to the pilot flame.

The selection of design parameters to create the bifurcated recirculation zone 52 includes consideration of both the diameter of the outlet 30 of air splitter 26, and the angle of swirl imparted to the airflow flowing therethrough. As will be understood by those skilled in the art, the greater the angle of swirl, the greater the centrifugal effect, and thus increasing swirl angle will tend to throw the pilot airflow further radially outward. The tapered design of the air splitter, on the other hand, tends to direct the pilot airflow mixture radially inward. The combination of these two will determine whether the desired bifurcated recirculation zone is created. Also, the amount of pilot airflow through the fuel injector is controlled mainly by the diameter of the outlet 30 and the angle of swirl through the outlet. If the percentage of pilot airflow is too low (less than four percent), the main airflow will dominate and produce a central recirculation zone. If the outlet opening 30 is too small or if too great a swirl angle is provided to the pilot air flow, then the pilot airflow will be thrown too far radially outward so that it merges with the main fuel air flow, which will in turn create a conventional central recirculation rather than the desired bifurcated recirculation. In general, for designs like those illustrated, the swirl angle of the pilot air stream should be less than about 30 degrees.

To further describe the various flow regimes within the combustor 14, the radial outer aft flow stream lines of the flow from the main airblast injector 20 are designated by arrows 54. Also, there are corner recirculation zones in the forward corners of combustor 14 indicated by arrows 56.

The outer flow streamline of the fuel and air flowing from the main airblast injector 20 and inner and outer main swirlers 22 and 24 is further affected by the presence of an aft flared wall 58 downstream of the main airblast fuel injector 20. The flare of aft flared wall 58 ends at an angle 60 to the longitudinal axis 11 which is preferably in the range of from 45° to 70°.

The outwardly flared outer wall 58 has a length 62 from the aft end 42 of main airblast injector 20 to an aft end 64 of the outer wall 58 sufficiently short to prevent autoignition of fuel within the outer wall 58. The length 62 may also be described as being sufficiently short to prevent fuel from the main fuel injector 20 from wetting the flared outer wall 58. In a typical embodiment of the invention, the length 62 will be on the order 0.2 to 0.3 inch.

The short residence time in the flared exit precludes autoignition within the nozzle. Significant evaporation and mixing does occur within the flared outlet, even for such a short residence time. The partial pre-mixing improves fuel/air distribution and reduces NOx. The extension combined with the flared exit also results in a larger stronger bifurcated recirculation zone 52.

Figure 5:
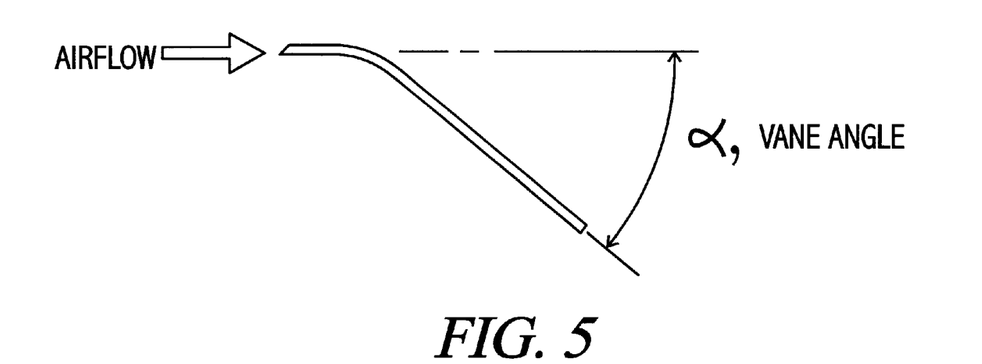
FIG. 5 illustrates the preferred construction of the curved aerodynamic axial vanes utilized with the swirlers.

As noted, the swirlers 18, 22 and 24 are schematically illustrated in FIG. 1. In one embodiment, the swirlers each include axial swirl vanes which are curved in a manner such as illustrated in FIG. 5. The curved axial swirl vanes are provided to reduce the Sauter Mean Diameter of the main fuel spray from the main airblast injector 20 as compared to the Sauter Mean Diameter that would be created when utilizing straight vanes.

The axial swirl vanes of the inner main swirler 22 preferably have a swirl vane angle in the range of from 25° to 60°. The axial swirl vanes of the outer main swirler 24 preferably have a swirl vane angle in the range of from 45° to 65°.

For vanes having a constant vane angle, the ranges set forth above apply literally. For helically curved vanes having a changing vane angle, the ranges set forth above are to be interpreted as the average swirl vane angle of the helical swirl vanes.

It will be appreciated that in a typical fuel injection system 10, all three swirlers 18, 22 and 24 are fed from a common air supply system, and the relative volumes of air which flow through each of the swirlers are dependent upon the sizing and geometry of the swirlers and their associated air passages, and the fluid flow restriction to flow through those passages which is provided by the swirlers and the associated geometry of the air passages. In one preferred embodiment of the invention of FIG. 1, swirlers are constructed such that from one to ten percent of total air flow through the swirlers is through the inner pilot swirler 19, two to fifteen percent of total air flow is through the outer pilot swirler 18, thirty to seventy percent of total air flow is through the inner main swirler 22, and the balance of total air flow is through the outer main swirler 24.

In FIG. 1, a pilot fuel supply line 66 is shown providing fuel to the pilot fuel injector 16, and a main fuel supply line 68 is shown providing fuel to the main airblast injector 20.

Figure 4:
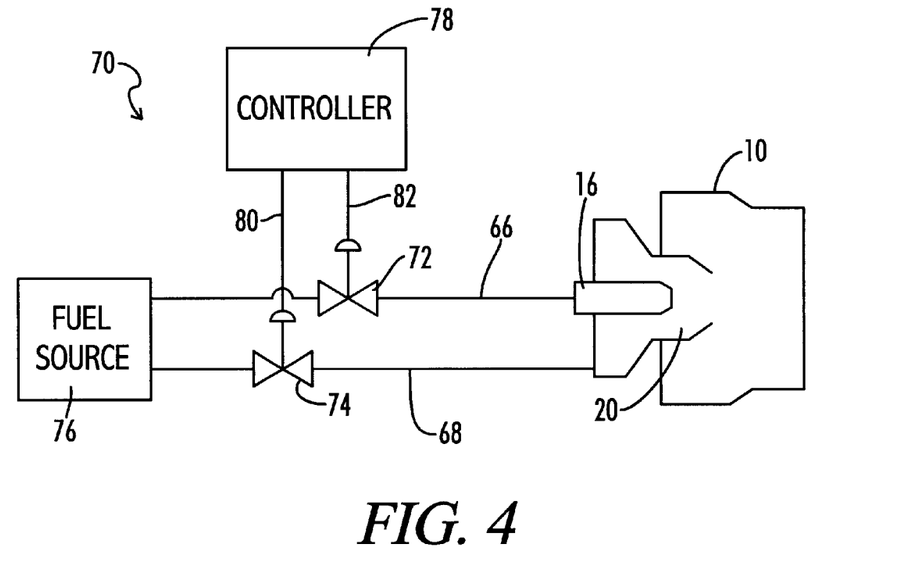
FIG. 4 is a schematic illustration of a fuel flow control system utilized with the invention.

FIG. 4 schematically illustrates a fuel supply control system 70 utilized with the fuel injector like the fuel injector system 10 of FIG. 1. The fuel supply control system 70 includes control valves 72 and 74 disposed in the pilot and main fuel supply lines 66 and 68, which supply lines lead from a fuel source 76. A microprocessor based controller 78 sends control signals over communication lines 80 and 82 to the control valves 72 and 74 to control the flow of fuel to pilot fuel injector 16 and main fuel injector 20 in response to various inputs to the controller and to the pre-programmed instructions contained in the controller. In general, during low power operation of the gas turbine associated with the fuel injection system 10, fuel will be directed only to the pilot fuel injector 16, and at higher power operating conditions, fuel will be provided both to the pilot fuel injector 16 and the main airblast fuel injector 20.

The pilot fuel is entrained between the inner air flow from the inner pilot swirler 19 and the outer air flow from the outer pilot swirler 18, which air flows cause the annular film of pilot fuel to be atomized into small droplets which are schematically illustrated and designated by the numeral 45.

During low power operation of the fuel injector 10, fuel is provided only to the pilot fuel injector 16 via the pilot fuel supply line 66. The fuel is atomized into the small droplets 45. The swirling motion of the air streams from inner and outer pilot swirlers 19 and 18 cause the pilot fuel droplets 45 to be centrifuged radially outwardly so that many of them are entrained within the bifurcated recirculating flow zone 52. This causes the pilot flame to be anchored within the bifurcated recirculation zone 52.

At higher power operation of the fuel injector 10, fuel is also injected into the main airblast injector 20 via the main fuel line 68. The main fuel droplets 29 are entrained within the air flow between air stream lines 50 and 54 which represent the inner and outer flow boundaries of the main air stream which flows through inner and outer main swirlers 22 and 24.

The air flow which flows through the swirlers 19, 18, 22 and 24 preferably is divided in the proportions previously described. As this air flow flows past the air splitter 26, the main air flow 50, 54 passing through main swirlers 22 and 24 is split away from the pilot air flow which flows through swirlers 19 and 18 and which must flow through the air splitter 26 and exit the outlet 30 thereof past trailing edge 37, thus creating the bifurcated recirculation zone 52 which separates the main air flow from the pilot air flow within the combustor 14.

Figure 2:
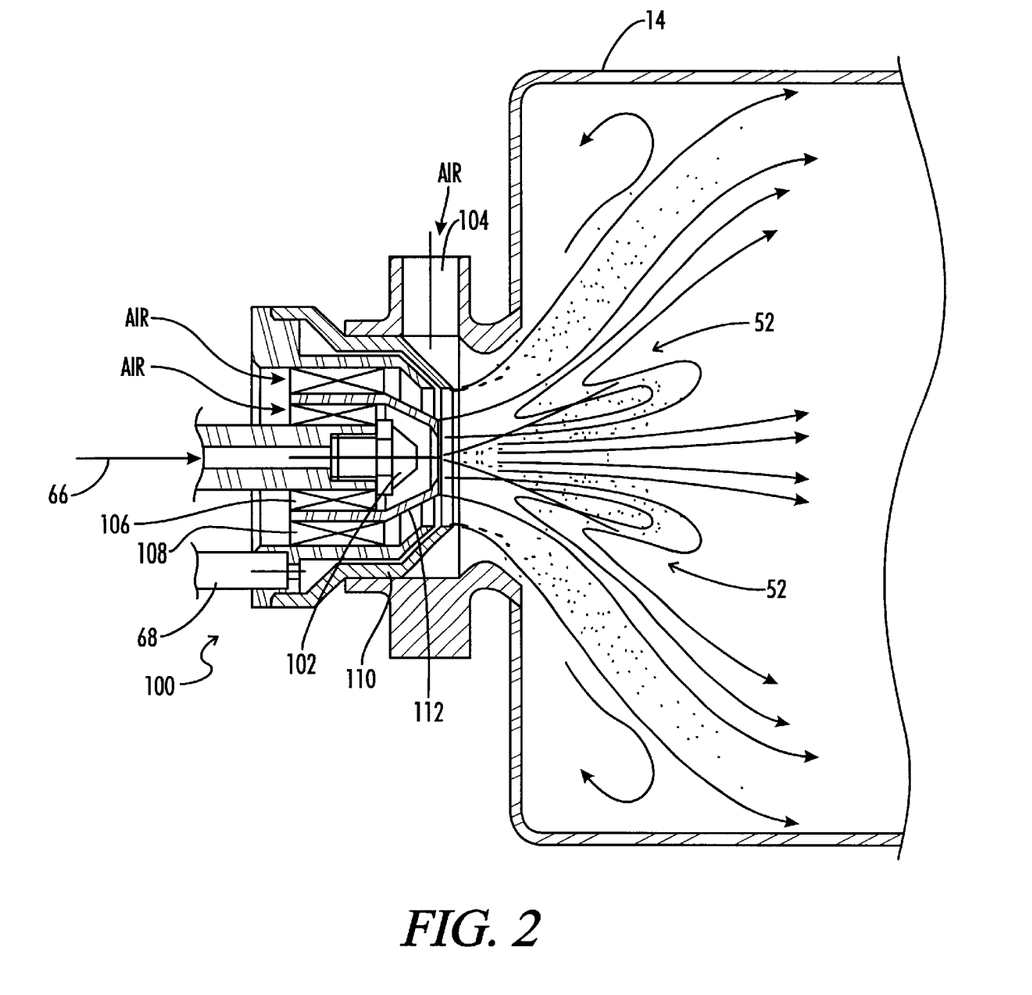
FIG. 2 illustrates an alternative embodiment of the invention utilizing a simplex pressure atomizer for the pilot fuel, and utilizing an airblast main injector. This embodiment utilizes an axial vaned pilot swirler, an axial vaned inner main swirler, and a radial injection outer main swirler.

The Simplex Piloted Airblast Injector of FIG. 2

FIG. 2 illustrates an alternative fuel injection assembly generally designated by the numeral 100. The related components such as the fuel supply lines, combustor and the various air flow regimes are substantially identical to those of the embodiment of FIG. 1 and are designated by the same numerals.

The primary modification of the fuel injector system 100 of FIG. 2, as compared to the fuel injector system 10 of FIG. 1, is that the fuel injector system 100 utilizes a pilot fuel injector 102 of the type commonly referred to as a simplex pressure atomizer fuel injector. As will be understood by those skilled in the art, the simplex pressure atomizer atomizes fuel based upon a pressure differential placed across the fuel, rather than atomizing fuel with a rapidly moving air stream as do the airblast atomizers described above with regard to FIG. 1. Another modification in the embodiment of FIG. 2 is that the outer main swirler 104 is of the radial injection type.

The fuel injection system 100 includes a pilot swirler 106 and an inner main swirler 108. Fuel injection system 100 includes an airblast type main fuel injector 110. An air splitter 112 separates the pilot air stream from the main air streams to again create the bifurcated recirculation zone 52 previously described.

The alternative embodiment of FIG. 2 utilizing the simplex pressure atomizer pilot fuel injector has been generally found to be more suitable for somewhat smaller gas turbine engines than is the embodiment of FIG. 1, because the overall radial dimension of the fuel injector can be minimized, which is important for minimizing the hole diameter through the engine case for insertion of the fuel injector. For example, the simplex piloted airblast fuel injector of FIG. 2 may be utilized with smaller jet aircrafts such as those utilized for regional jet service. However, there is nothing precluding the use of the simplex piloted airblast fuel injector of FIG. 2 being utilized in larger jet aircrafts, and recent experimental tests have shown superior lean blowout was obtained with the embodiment compared to the airblast piloted version 10.

In the system of FIG. 2, the relative volumes of air flow through the pilot swirler 106 and the inner and outer main swirlers 108 and 104 is somewhat different from the embodiment of FIG. 1. In one version of the system 100, the swirlers and passage heights are constructed such that from 5 to 20 percent of total swirler air flow is through the pilot swirler 106, from 30 to 70 percent of total air flow is through the inner main swirler 108 and the balance of total air flow is through the outer main swirler 104.

When utilizing the simplex pressure atomizer pilot fuel injector, the atomizer should be selected with a high spray angle to inject spray into the bifurcated recirculation zone, but not so high as to impinge onto the air splitter 26.

Figure 3:
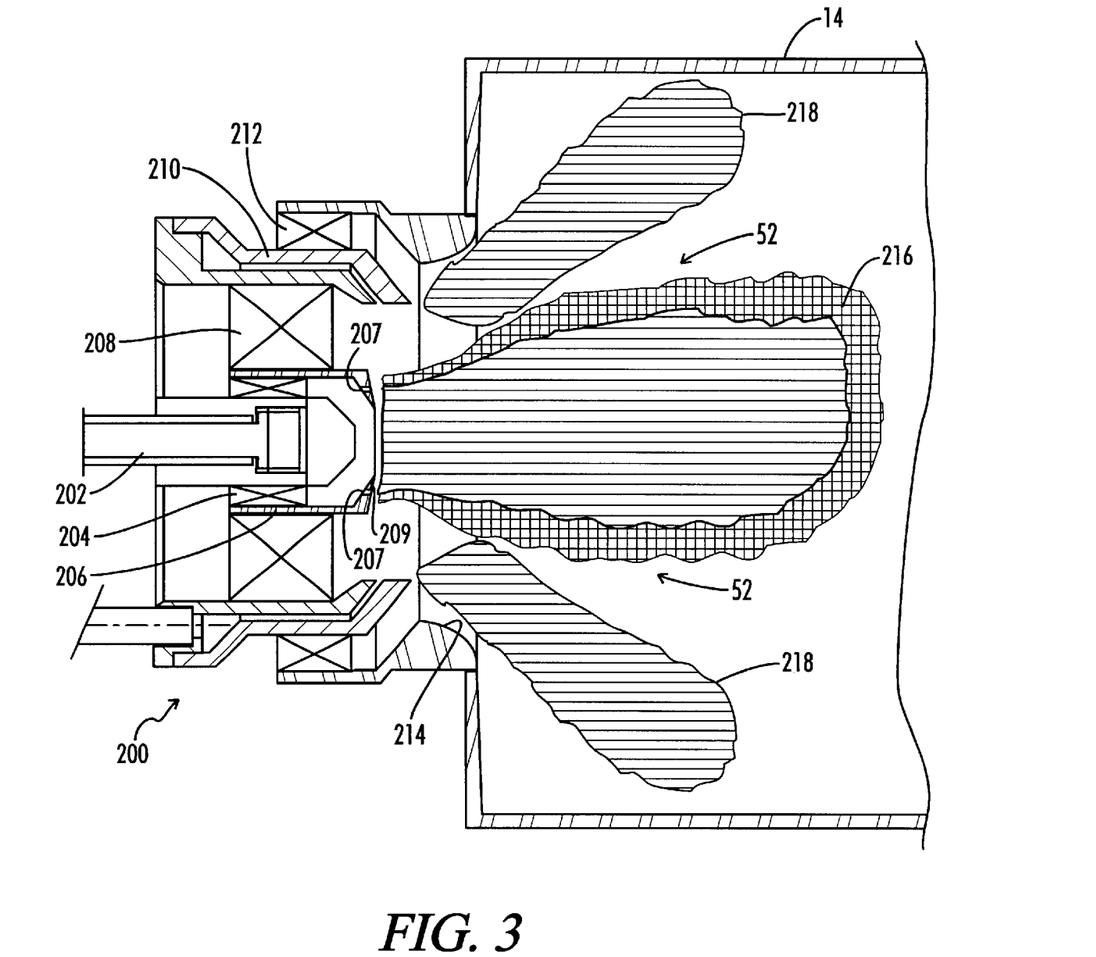
FIG. 3 is a cross-sectional schematic view of another alternative embodiment of the invention which, like the embodiment of FIG. 2, has a simplex pressure atomizer pilot injector, and an airblast main injector. The embodiment of FIG. 3 utilizes an axial vaned outer main swirler. Also in FIG. 3, the flame pattern is schematically illustrated and the legends in the figure denote the typical flame colors contained in the flame pattern during high power operation.

The Embodiment of FIG. 3

FIG. 3 illustrates a third embodiment of the fuel injection system of the present invention which is shown and generally designated by the numeral 200. The fuel injector system 200 is a simplex pressure atomizer piloted system similar to that of FIG. 2. The system 200 includes a simplex pressure atomizer pilot fuel injector 202, a pilot swirler 204, air splitter 206, an inner main swirler 208, and airblast main fuel injector 210, an outer main swirler 212, and a flared aft outlet wall 214. Differences as compared to the fuel injector system 100 of FIG. 2 include a slightly different geometry of the air splitter 206, and the use of an axial vaned outer main swirler 212 rather than the radial swirler of FIG. 2.

FIG. 3 also includes a schematic representation of the shape and color of both a pilot flame 216 and a main flame 218 at full power conditions and a 10/90 pilot/main fuel flow split. As previously noted, the pilot flame 216 is anchored by and generally contained within the bifurcated recirculation zone 52. The pilot flame is generally yellow in its radial and axially aft extremities and has a generally blue axially forward axial portion. The main flame 218 is generally blue in color. In general, blue flames are fuel-lean flames, and are a necessary, but not sufficient, condition of low NOx emissions. This is because lean flames can still have local stoichiometry (fuel-to-air ratio) that approaches stoichiometric values and the hottest possible temperatures. The ideal situation (for lowest NOx emissions) would be for the main fuel to entirely prevaporize and premix with the main airflow before reaction occurs, thus producing a uniform stoichiometry and lowest possible flame temperatures. Although fuel/air uniformity is desired, many factors can influence how closely uniform stoichiometry is achieved in the real application, e.g. circumferential fuel uniformity, vane wakes from the swirlers, airfeed uniformity into the swirlers, etc.

Yellow flames are always indicative of fuel-rich flames, and stoichiometric flames somewhere in the flowfield. This type of flame is to be expected (and desired) for the pilot flame in order to minimize the fuel-to-air ratio of the fuel injector at lean blowout. Since only approximately 10 percent of the total fuelflow enters the pilot at full power conditions, the amount of NOx produced by the pilot flame is somewhat limited. If possible, the amount of pilot fuel should be reduced at full power conditions to minimize NOx emissions; however, at low pilot fuelflows, one must be concerned about carbon deposition within the pilot fuel circuit. For minimum full power NOx, pilot fuelflow can be eliminated if purging is performed.

As seen in FIG. 3, the air splitter 206 may have small diameter holes 207, in the range of 0.010 to 0.060 inch diameter placed around the tapered end portion, and spaced from 2 to 8 hole diameters apart, to improve durability of the splitter 206 and to eliminate carbon formation on the downstream face 209 of the splitter.

Thus, it is seen that the methods and apparatus of the present invention readily achieve the ends and advantages mentioned as well as those inherent therein. While certain preferred embodiments of the invention have been illustrated and described for purposes of the present disclosure, numerous changes in parts and steps may be made by those skilled in the art, which changes are encompassed within the scope and spirit of the present invention as defined by the appended claims.

What is claimed is:

1. A fuel injection system for a gas turbine, comprising:
   a pilot fuel injector;
   a pilot swirler for swirling air past the pilot fuel injector;
   a main airblast fuel injector;
   inner and outer main swirlers for swirling air past the main airblast fuel injector; and an air splitter, located between the pilot swirler and the inner main swirler, the air splitter being so arranged and constructed to divide a pilot air stream exiting the pilot swirler and the air splitter, from a main air stream exiting the inner main swirler, whereby a bifurcated recirculation zone is created between the pilot air stream and the main air stream.

2. The system of claim 1, further comprising:

a fuel supply control system for providing fuel only to the pilot fuel injector at lower power conditions, and for providing fuel to both the pilot fuel injector and the main airblast fuel injector at higher power conditions.

3. The system of claim 1, wherein:

the main airblast fuel injector includes an atomizer filmer lip having an aft end; and the air splitter has an aft end angled radially inboard and axially positioned upstream of the aft end of the atomized filmer lip of the main airblast fuel injector.

4. The system of claim 1, further comprising:

an outwardly flared wall downstream of the main airblast fuel injector, the flare ending at an angle in the range of 45° to 70° to a central axis of the main airblast fuel injector.

5. The system of claim 4, wherein:

the outwardly flared outer wall has a length from an aft end of the main airblast fuel injector to an aft end of the outer wall sufficiently short to prevent autoignition of fuel within the outer wall.

6. The system of claim 4, wherein:

the outwardly flared outer wall has a length from an aft end of the main airblast fuel injector to an aft end of the outer wall sufficiently short to prevent main fuel wetting of the flared outer wall.

7. The system of claim 1, wherein:

the pilot fuel injector is a pressure atomizer; and the pilot swirler surrounds the pressure atomizer.

8. The system of claim 1, wherein:

the swirlers are constructed such that from 5 to 20% of total airflow is through the pilot swirler, from 30 to 70% of total airflow through the swirlers is through the inner main swirler, and the balance of total airflow is through the outer main swirler.

9. The system of claim 1, wherein:

the pilot fuel injector is a pilot airblast fuel injector; and the pilot swirler includes inner and outer pilot swirlers located inward and outward of the pilot airblast fuel injector.

10. The system of claim 9, wherein:

the swirlers are constructed such that 1 to 10% of total airflow through the swirler is through the inner pilot swirler, 2 to 15% of total airflow is through the outer pilot swirler, 30 to 70% of total airflow is through the inner main swirler, and the balance through the outer main swirler.

11. The system of claim 1, wherein:

the inner and outer main swirlers each include axial swirl vanes.

12. The system of claim 11, wherein:

the axial swirl vanes are curved to reduce the Sauter Mean Diameter of a main fuel spray from the main airblast injector.

13. The system of claim 11, wherein:

the axial swirl vanes of the inner main swirler have a swirl vane angle in the range of 25 to 60 degrees; and the axial swirl vanes of the outer main swirler have a swirl vane angle in the range of 45 to 65 degrees.

14. A fuel injection system for a gas turbine, comprising:

a pilot fuel injector;

a pilot swirler for swirling air past the pilot fuel injector;

a main airblast fuel injector;

inner and outer main swirlers for swirling air past the main airblast fuel injector; and an air-splitter means, located between the pilot swirler and the inner main swirler, for dividing an outer pilot air stream exiting the pilot swirler from an inner main air stream exiting the inner main swirler, and for thereby creating a bifurcated recirculation zone.

15. The system of claim 14, wherein:

the main airblast fuel injector includes an atomizer filmer lip having an aft end; and the air splitter means has an aft end angled radially inboard and axially positioned upstream of the aft end of the atomized filmer lip of the main airblast fuel injector.

16. A fuel injector apparatus for a gas turbine, comprising:

a primary fuel injector;

a first swirler, nested about the primary fuel injector;

a second swirler nested about the first swirler;

a secondary fuel injector, nested about the second swirler;

a third swirler nested about the secondary fuel injector; and an air splitter, nested between the first and the second swirler, and having a radially inwardly tapered inner surface defining an outlet opening, the outlet opening being disposed axially downstream of the primary fuel injector for creating a bifurcated recirculation zone.

17. The apparatus of claim 16, wherein:

the secondary fuel injector is an airblast, secondary injector having an annular fuel outlet and a pre-filming surface for providing an annular film of fuel to be entrained between the second and third swirlers.

18. The apparatus of claim 17, further comprising:

a flared outlet axially downstream of the secondary fuel injector.

19. The apparatus of claim 16, wherein:

the primary fuel injector is an airblast primary injector; and the apparatus further includes a fourth swirler nested inside of the primary fuel injector.

20. The apparatus of claim 16, wherein:

the primary fuel injector is an axially located pressure atomizer.

21. A fuel injector apparatus for a gas turbine, comprising:

an axially located pressure atomizer first fuel injector;

a first swirler located concentrically about the pressure atomizer fuel injector;

a second swirler located concentrically about the first swirler;

a third swirler located concentrically about the second swirler;

an airblast fuel injector located concentrically between the second and third swirlers; and an air splitter located concentrically between the first and second swirlers.

22. A fuel injector apparatus for a gas turbine comprising:

a first swirler;

a second swirler located concentrically about the first swirler;

a third swirler located concentrically about the second swirler;

a fourth swirler located concentrically about the third swirler;

an inner airblast fuel injector located concentrically between the first and second swirlers;

an outer airblast fuel injector located concentrically between the third and fourth swirlers; and an air splitter located concentrically between the second and third swirlers.

23. A method of injecting fuel into a gas turbine, comprising:

(a) injecting a pilot fuel stream;

(b) injecting a main fuel stream concentrically about the pilot fuel stream;

(c) providing a swirling pilot air stream to entrain the pilot fuel stream;

(d) providing a swirling main air stream to entrain the main fuel stream; and (e) splitting the pilot air stream from the main air stream and creating a bifurcated recirculation zone between the pilot air stream and the main air stream.

24. The method of claim 23, wherein step (e) further includes:

avoiding creation of a central recirculation zone.

25. The method of claim 23, further comprising:

centrifuging the pilot fuel stream into the bifurcated recirculation zone by means of the swirling pilot air stream of step (c).

26. The method of claim 25, further comprising:

anchoring a pilot flame in the bifurcated recirculation zone.

27. The method of claim 23, wherein:

step (a) includes injecting the pilot fuel stream through an axially located pressure atomizer injector;

step (b) includes injecting the main fuel stream through an airblast injector; and step (d) includes providing inner and outer swirling main air streams inward and outward of the airblast injector.

28. The method of claim 27, further comprising:

dividing a total airflow between the pilot air stream and the inner and outer main air streams such that:

the pilot air stream includes from 5 to 20% of total airflow;

the inner main air stream includes from 30 to 70% of total air flow; and the outer main air stream includes the balance of total airflow.

29. The method of claim 23, wherein:

step (a) includes injecting the pilot fuel stream through a pilot airblast injector;

step (b) includes injecting the main fuel stream through a main airblast injector;

step (c) includes providing inner and outer swirling pilot air streams; and step (d) includes providing inner and outer swirling main air streams.

30. The method of claim 29, further comprising dividing a total airflow between the air streams such that:

the inner pilot air stream includes from 1 to 10% of total airflow;

the outer pilot air stream includes from 2 to 15% of total airflow;

the inner main air stream includes from 30 to 70% of total airflow; and the outer main air stream includes the balance of total air flow.

* * * * *